United States Patent [19]
Chen et al.

[11] Patent Number: 5,508,077
[45] Date of Patent: Apr. 16, 1996

[54] TEXTURED DISC SUBSTRATE AND METHOD

[75] Inventors: Ga-Lane Chen; Jack Xuan, both of Fremont, Calif.

[73] Assignee: HMT Technology Corporation, Fremont, Calif.

[21] Appl. No.: 99,910

[22] Filed: Jul. 30, 1993

[51] Int. Cl.⁶ .................................................. B32B 3/02
[52] U.S. Cl. ......................... 428/64.3; 428/329; 428/331; 428/900; 428/913; 369/272
[58] Field of Search ..................... 51/293, 295; 428/329, 428/331, 64, 900, 913; 360/135; 346/137; 369/272

[56] References Cited

U.S. PATENT DOCUMENTS

| | | |
|---|---|---|
| 4,330,910 | 5/1982 | Schachl et al. |
| 4,430,782 | 2/1984 | Bornhorst et al. |
| 4,535,567 | 8/1985 | Seaborn |
| 4,656,790 | 4/1987 | Mukai et al. |
| 4,941,293 | 7/1990 | Ekhoff ................................. 51/168 |
| 5,070,425 | 12/1991 | Inumochi |
| 5,123,933 | 6/1992 | Ito et al. |
| 5,155,372 | 10/1992 | Bowen et al. ........................ 250/571 |

OTHER PUBLICATIONS

Tsai, H.-S., et al., "Tribological phenomena at the head–disk interface of thin–film rigid disks," *J. Vac. Sci. Technol.* A 7(3):2491–2495 (1989).

*Primary Examiner*—Patrick J. Ryan
*Assistant Examiner*—William A. Krynski
*Attorney, Agent, or Firm*—Peter J. Dehlinger; Judy M. Mohr

[57] ABSTRACT

A disc substrate having a selected roughness gradient from an inner-diameter region to an outer-diameter region, and a method of producing the texturing on the substrate are disclosed. The method includes simulating the movement of texturing particles produced by rotating a texturing pad against a rotating disc substrate, at selected substrate and pad rotational speeds and directions, and for a selected run time. Simulation conditions which produce an averaged crosshatch angle of intersecting texture lines that is at least about 2 times greater at the inner-diameter region of the substrate than at the outer-diameter region are selected.

4 Claims, 12 Drawing Sheets

TEXTURED DISC SUBSTRATE AND METHOD

1. Field of the Invention

The present invention relates to thin-film magnetic storage discs, and in particular, to a textured disc substrate having a radial roughness gradient, and to a method for producing such texture gradient.

2. Background of the Invention

Over the past several years, a significant increase in recording density in thin-film magnetic recording discs has been achieved, and there is a continuing effort to increase recording density further.

A number of magnetic properties in a thin-film disc are important to achieving high recording density, including high coercivity and remanence, and low flying height. The latter property is important because, as the read/write head is moved closer to the disk, there is less overlap of voltage signals in adjacent magnetic domains in the disc, with a corresponding increase in recording density.

Heretofore, disks having high coercivity and remanence characteristics have been prepared by sputtering a thin magnetic film on a metal substrate, typically an aluminum substrate. Prior to sputtering, the substrate is plated with an alloy plating, such as a nickel/phosphorus plating to achieve a requisite surface hardness. The plated disc is then polished to remove surface nodules which form during the plating process.

The plated substrate may be textured by abrading or sanding, using an abrasive pad placed off center with respect to the surface of the spinning substrate, or by etching with acid. The purpose of the texturing is to create a toughened surface characterized by submicron surface irregularities. The roughened surface reduces stiction (static friction) between the disk and head by reducing surface contact between the two, particularly for start/stop cycles which occur at an inner-diameter landing zone in on the disc surface.

Conventional texturing processes produce generally uniform texturing roughness from inner diameter (ID) to outer diameter (OD) of the discs. Such discs are a compromise between the requirements of low glide height in the outer recording region of the disc and low stiction and friction in the CSS zone. It is possible, using photolithography or masking processes to produce increased roughness in the CSS zone. These processes are generally impractical for mass scale production due to high processing costs.

There thus remains a need for a disc that provides for both low glide height and reduced head/disk interface stiction in the CSS zone that avoids the problems of previously known techniques and yet is economical to produce. There further is a need for simulating the texturing of a disc substrate by a texturing pad in order to find acceptable configurations for texturing a disc without the expense and time required to physically try all of the different possible configurations.

4. Summary of the Invention

In one aspect, the invention includes a disc substrate for use in forming a thin-film magnetic recording medium. The disc includes an annular surface having inner, middle, and outer diameter regions, and formed on this surface, a gradient textured pattern of grooves characterized by an averaged cross-hatch angle which is least about 2 times greater at the inner-diameter region than at the outer-diameter region. The averaged cross-hatch angle is defined as the average of twice the angle a groove makes with a line extending in a circumferential direction.

In one preferred embodiment, the averaged cross-hatch angle at the inner-diameter region is between about 20–30 degrees, and the averaged cross-hatch angle at the outer-diameter region is between about 3–8 degrees.

Also forming part of the invention is a method of forming a disc substrate of the type just described. The method includes simulating the formation of grooves formed on the disc surface by the movement of particles on a rotating pad whose outer diameter is less than the substrate outer radius and greater than the radial width of the substrate, where both the substrate and pad are rotated in selected directions and at selected speeds for a selected run time, and the pad's rotational axis is offset from that of the substrate.

From the simulated groove pattern, the averaged cross-hatch angle at inner- and outer-diameter regions of the substrate are calculated. Substrate and pad rotational speeds and run time which produce a textured pattern of grooves characterized by an averaged cross-hatch angle which is least about 2 times greater at the inner-diameter region than at the outer-diameter region are then selected for actual texturing.

In still another aspect, the invention provides texture simulation system for use in producing a disc substrate having a selected roughness gradient extending in and between inner-diameter and outer-diameter regions, by texturing the substrate with a pad having an outer diameter that is less than the substrate outer radius and greater than the radial width of the substrate, where the substrate and pad are rotated in selected directions and at selected rotational speeds about offset axes for a selected total run time.

The system includes a first calculating capability for determining the path of grooves which would be produced on the substrate surface by particles on the pad, when the disc and pad are rotated at selected speeds and in selected directions, and a second calculation capability for determining an averaged cross-hatch angle at inner-diameter and outer-diameter regions of the substrate. Employing the simulation and cross-hatch angle calculations, substrate and pad rotational speeds and directions and total run time which yield an averaged cross-hatch angle in the inner-diameter region which is at least about 2 times greater than that in the outer-diameter region can be selected.

These and other features and advantages of the invention will become more fully understood when the following detailed description of the preferred embodiment of the invention is read in conjunction with the accompanying drawings.

DETAILED DESCRIPTION OF THE INVENTION

Figure 1:
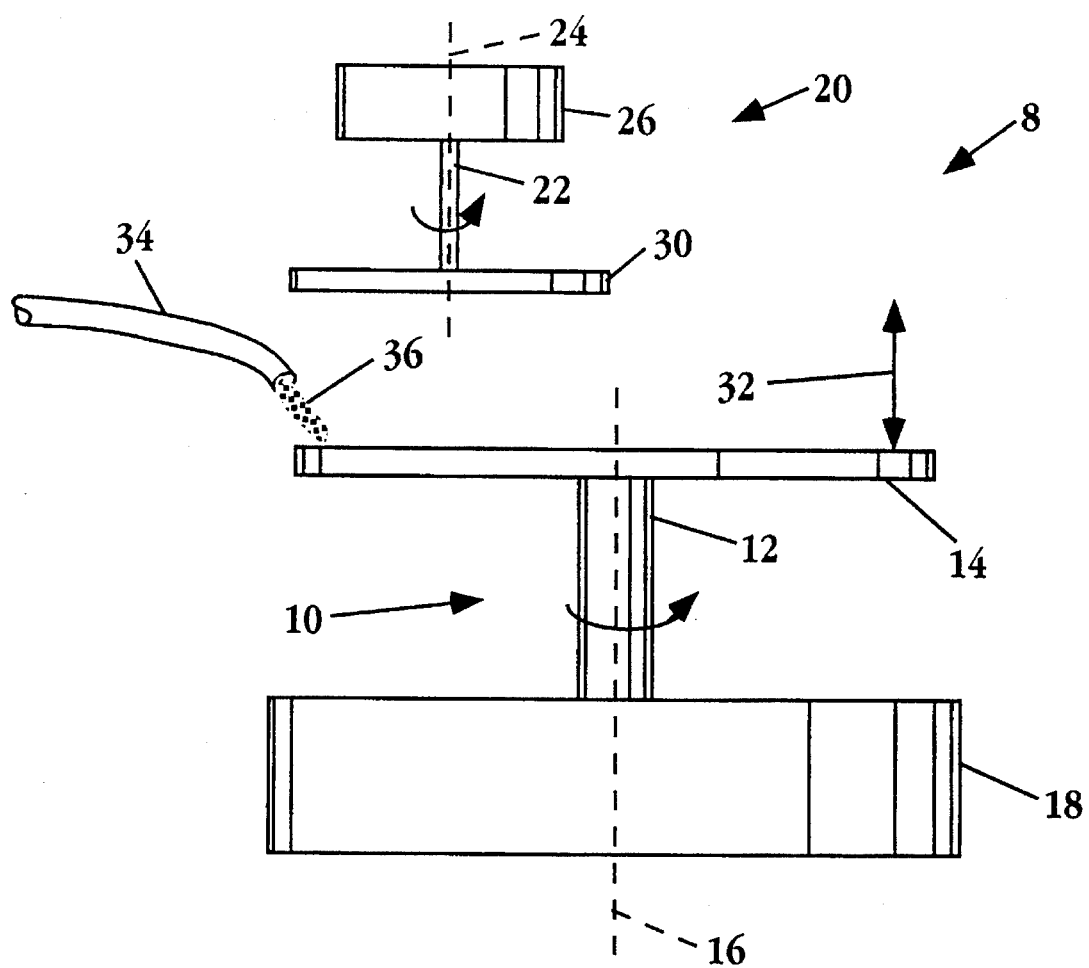
FIG. 1 shows a magnetic disc texturing apparatus made according to the present invention.

FIG. 1 is a schematic view of an apparatus 8 designed for use in texturing the surface of a substrate, in accordance with the invention. A substrate assembly 10 in the apparatus includes a spindle 12 which rotates a magnetic disc substrate, such as substrate 14, about a central axis, indicated by dashed line 16. The spindle is driven by a motor 18 whose speed can be adjusted.

A pad assembly 20 in the apparatus includes a spindle or quill 22 which is rotatable about an axis 24 that is parallel to and offset from axis 16. The relative offset of the two rotational axes can be adjusted. The quill is driven at a selected speed by a motor 26 in the pad assembly. A texturing pad 30 is mounted on the quill for rotation therewith.

The pad assembly is mounted for shifting toward and away from a texturing position at which the surface of the pad is brought into contact with the surface of the substrate, with a selected contact force. The shifting mechanism in the apparatus is indicated by arrow 32.

Completing the description of what is shown in the figure, the apparatus includes a tube 34 for introducing a particle slurry 36 onto the surface of the disc or pad as the pad is brought into contact with the substrate. The texturing apparatus or machine just described is commercially available, such as from Strausbough of San Luis Obispo, Calif.

Figure 2:
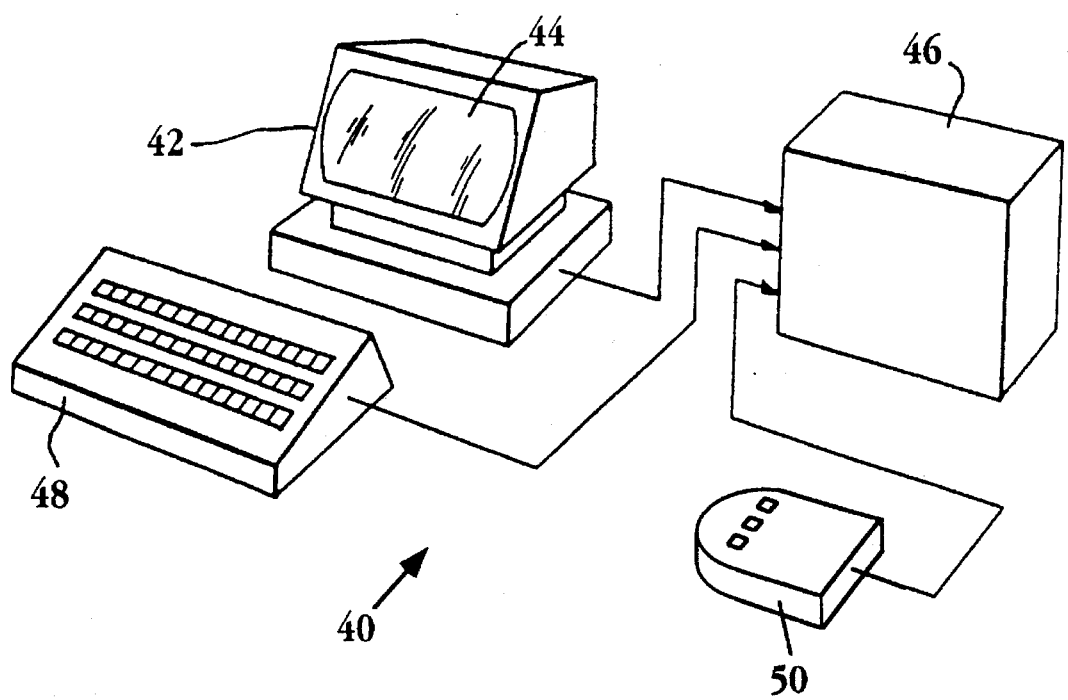
FIG. 2 is a perspective view of the components of a system for performing a texturing simulation according to the invention.

Turning now to FIG. 2, a computer system 40 for simulating a texturing process performed by apparatus 8 of FIG. 1 comprises a graphics terminal 42 with a display screen 44. Graphics terminal 42 is coupled to a computer processor 46, which also supports a keyboard 48 and mouse 50. Computer system 40 can be a commercially available computer system, such as a personal computer or work station.

One of the main reasons for texturing the surface of a thin-film disc with a micro-machining process is to minimize the stiction at the head/disc interface by roughening the micro-contact region and reducing the real contact area between the head and disc. At the same time, in order to minimize the roughness-induced effect on the performance of high-density magnetic recording, the pattern of the micro-machining as well as the degree of roughness must be well controlled.

There are continuing improvements in disc sputtering and lubrication processes. A major issue resulting from these improvements is stiction in a high humidity environment. Further, with the rapid development of new disc drives, smaller disk sizes and smaller read/write heads, the texturing process has to be continuously improved. Modification of conventional texturing techniques to optimize the mechanical and magnetic properties of these systems by manual experimental techniques would require a lot of manpower, time and material consumption, and would thereby be very expensive. It has been found that by simulating the texturing process, a substantial savings in each of these factors can be realized.

Figure 3:
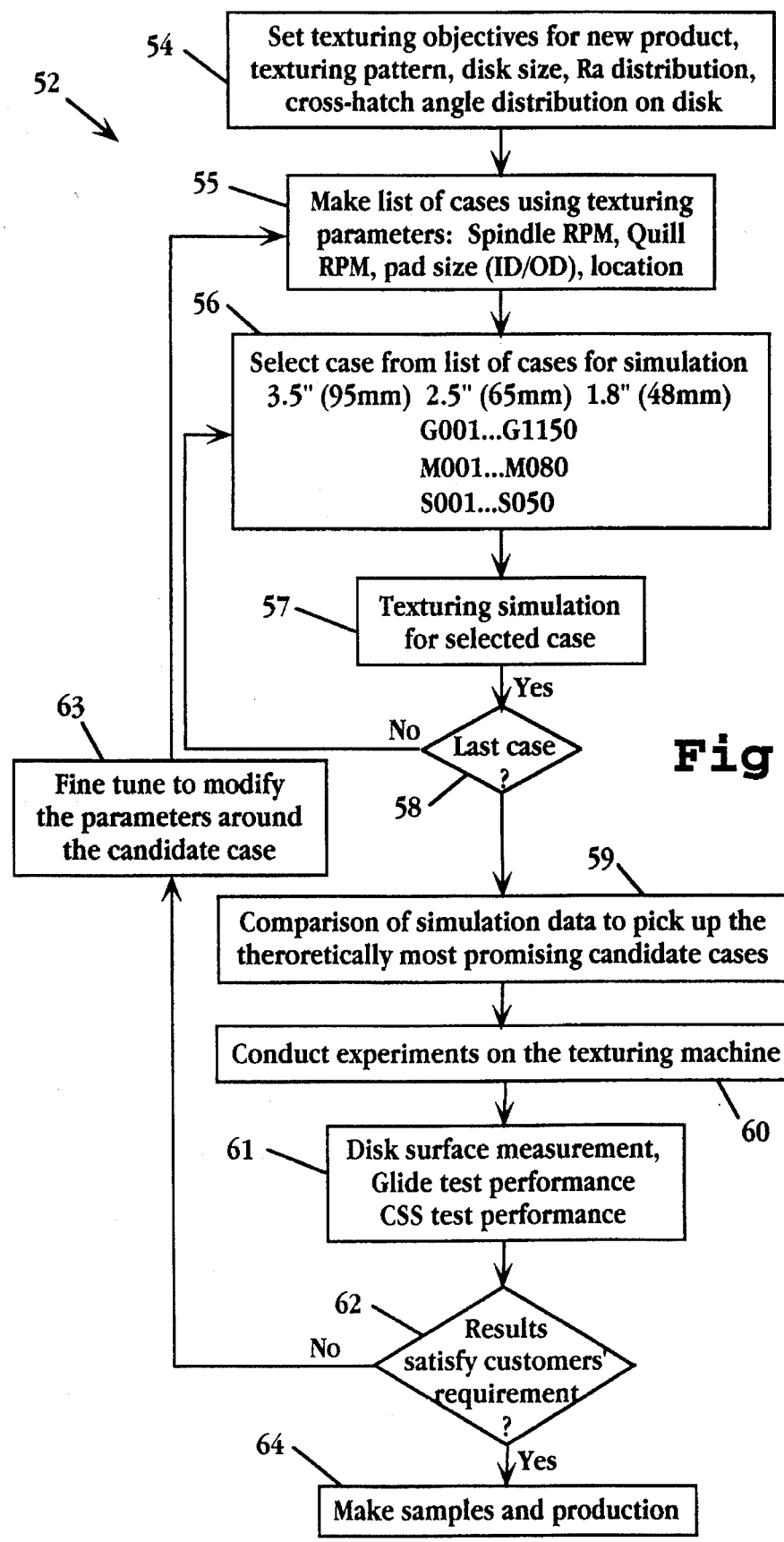
FIG. 3 is a flow chart of the overall procedure incorporating a simulation according to the invention for developing a new textured magnetic disc.

A new product development procedure 52 incorporating such a simulation is illustrated by the flow chart in FIG. 3. Initially at step 54 texturing objectives for the new disc are set. These include such items as texturing pattern, disc size, slurry particle cross line density distribution and cross-hatch angle distribution on the disc. Based on knowledge from past texturing configurations, texturing parameters are then set at step 55. This includes spindle and quill rotational speed, pad inner and outer diameter sizes, location of the pad relative to the disc and duration of the process. Table 1 below lists the ranges of typical values for these various parameters.

TABLE 1

| | Industrial Standard | | | | Parameters Selectable in Manufacturing | | | | |
|---|---|---|---|---|---|---|---|---|---|
| Disk Size (mm) | Disk ID (mm) Rdi | Disk OD (mm) Rdo | Disk Radius Length (mm) | Customer Defined CSS Zone (mm) | Pad ID (mm) Rpi | Pad OD (mm) Rpo | Pad Center Location (mm) Rr | Pad Rotation Speed (RPM) ωp | Disk Rotation Speed (RPM) ωp | Texturing Time (min.) t |
| 95 | 25 | 95 | 35 | 19–23 | 0–25 | 35–65 | 13–47 | 1–150 | 5–250 | 0.1–10 |
| 65 | 20 | 65 | 22.5 | 14.5–17 | 0–17 | 22–44 | 11–32 | 1–150 | 5–250 | 0.1–10 |
| 48 | 12 | 48 | 18 | 8.5–11 | 0–14.5 | 18–33 | 7–24 | 1–150 | 5–250 | 0.1–10 |

A list of different cases to simulate are identified. This list can be for different disc sizes, such as 95 mm, 65 mm and 48 mm diameter discs. Each entry on the list, such as is represented by arbitrarily identified cases, such as cases G001– G1150, would involve some variation in the texturing parameters.

A case from the list of cases is then selected at step 56 for performing the simulation. The selected case is then simulated at step 57. A determination is made at step 58 as to whether the last simulation case has been performed. If not, the next case is selected at step 56 and the simulation performed on it. If the last simulation has been performed, the simulation results for the listed cases are compared at step 59. The theoretically most promising candidate cases are selected from the list.

Physical experiments are then performed on these relatively few cases at step 60. The disc surface characteristic measurements, such as glide and CSS test performances, of the discs are then made at step 61. These results are compared to the texturing objectives at step 62. If the objectives are not met, then the parameters are modified at step 63 relative to the most favorable case and a new list of cases are generated at step 55. The procedure following step 55 is then repeated. Once satisfactory results are achieved, samples are made for tribology testing, including CSS and glide height testing, and production of the discs is initiated at step 64.

Figure 4:
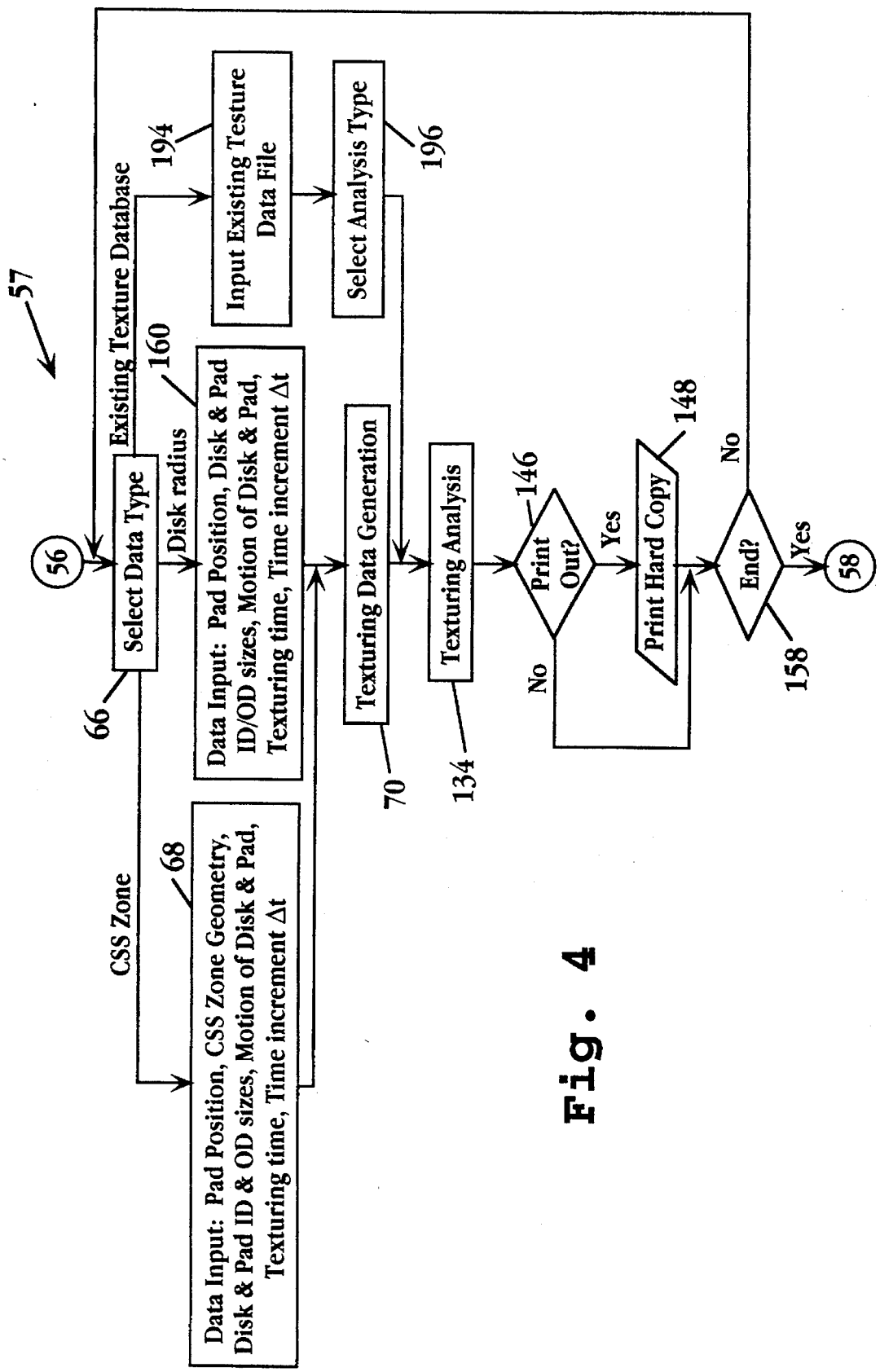
FIG. 4 is a flow chart of the simulation procedure incorporated in the flow chart of FIG. 3.

Simulation step 57 is shown in more detail in the flow chart of FIG. 4. In initiating the simulation at step 66 a determination is made as to the type of data to be generated or that is available. When a simulation for a selected case has not been performed, then data is generated initially for analyzing texturing in the CSS zone. This is initiated at step 68 by inputting data on the position of the pad relative to the disc, the CSS zone geometry, the disc and pad inner and outer diameters, the disc and pad rotational speeds and directions, the total texturing time, and increment of time between calculation points. The texturing data generation is then performed at step 70.

In this simulation, it is assumed that during micro-machining or texturing, the texturing pattern on the substrate surface is caused by texturing particles fixed in positions on the texturing pad moving across the surface of the substrate. This turns out to be a reasonable assumption for an ideal case. The variance from the ideal case in an actual texturing case is largely due to pad material, particle material and size, texturing coolant properties, and quill pressure.

Figure 6:
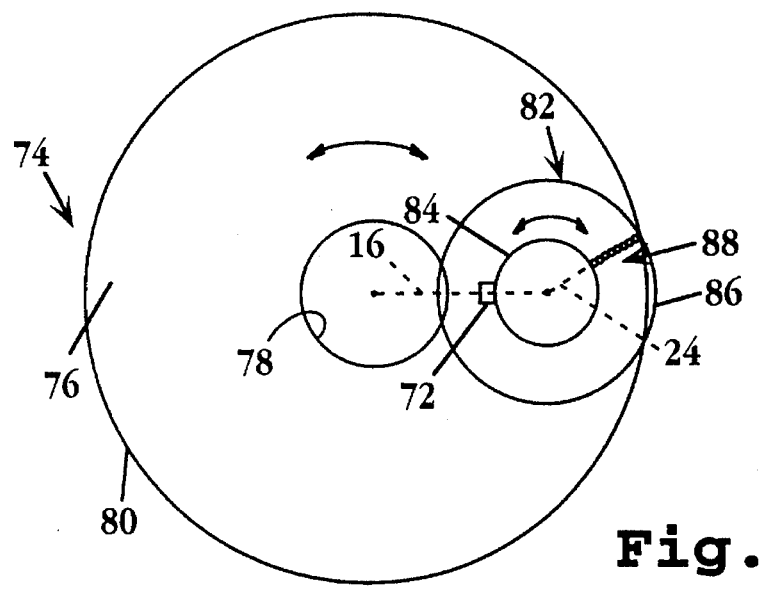
FIG. 6 is a simplified top view of a texturing pad and disc made according to the invention and illustrating the initial conditions used in a simulation of texturing in the CSS zone.
Figure 8:
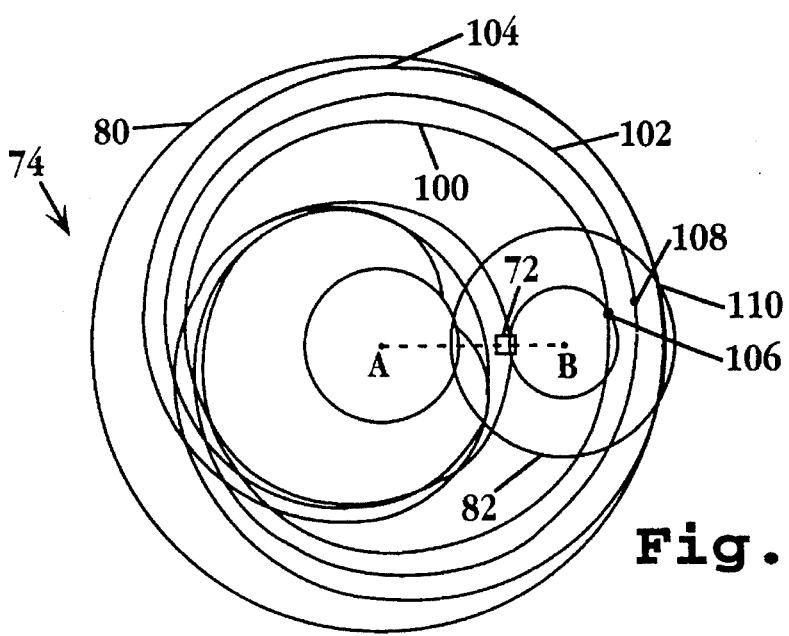
FIG. 8 is a simulation-generated image of the spiral paths of selected pad points on a disc.

FIG. 6 illustrates the simulation case in which the evaluation is of a CSS zone, represented by a rectangle 72, on a disc 74 having a substrate 76 with inner diameter and outer diameters represented, respectively, by circles 78 and 80, respectively. A pad 82, having inner and outer diameters 84 and 86, respectively, is positioned so that pad axis 24 is on the substrate, offset from disc axis 16, as shown in FIGS. 1 and 8. A set 88 of preferably 100 points on a radius of the pad are selected for tracking along the surface of substrate 76 as the pad and disc rotate.

Figure 7:
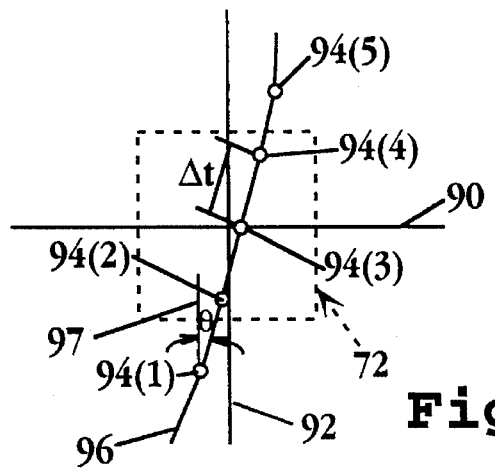
FIG. 7 is an enlarged view of the CSS zone of the disc of FIG. 6 illustrating data generation in the simulation procedure of FIG. 4.

FIG. 7 is an enlarged view of CSS zone 72. Line 90 represents a radial line on the substrate, and line 92 represents a circumferential line. A pad point 94 is shown in different progressive positions in the region of zone 72 as it travels along a travel path or particle trace 96 at successive time increments Δt. Successive positions of point 94 are represented by 94(1)–94(5). The angle that the particle trace 96 makes with a reference circumferential line 97 through the point is represented by angle θ. Angle θ, also referred to as the cross angle, is half the cross-hatch angle (2θ), or the angle the trace makes with a second trace crossing at the same point but at the opposite angle (θ) relative to the circumferential line.

CSS zone 72 is represented by a two-dimensional grid of points corresponding to the sides of the zone, as illustrated. Each occurrence of a pad point on a zone point, as represented by the positions of points 94(2)–94(4), along with the particle trace angle at that point, are computed and stored in memory. The texturing computations continue for each point of point set 88 on the radial line of the pad at increments of Δt until the total texturing time is reached.

FIG. 8 illustrates three traces 100, 102 and 104 for three pad points 106, 108 and 110, respectively for a duration of one second. It can be seen that in this one second, only trace 100 of pad point 106 passed through zone 72.

Figure 5:
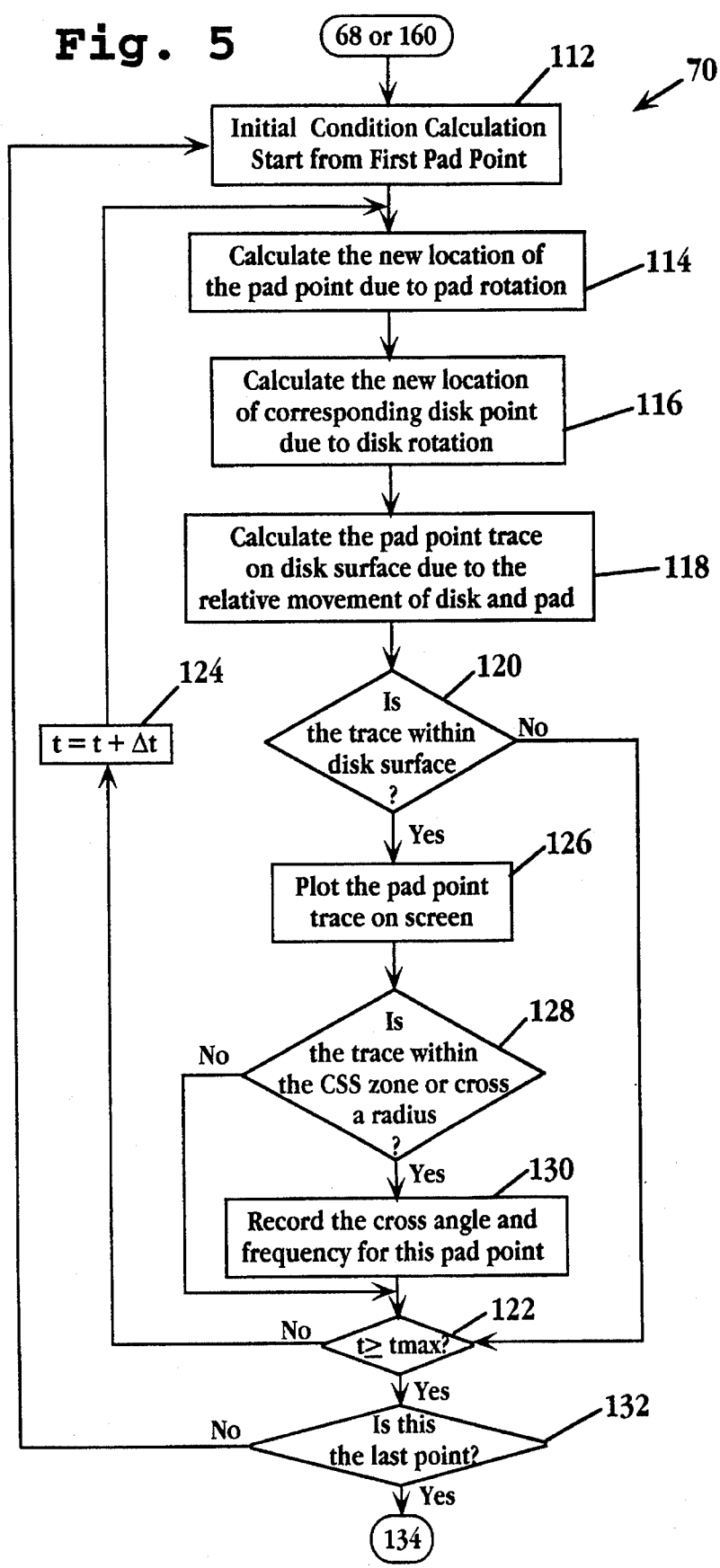
FIG. 5 is a flow chart of the data generating phase of the simulation procedure of FIG. 4.

FIG. 5 shows data generation step 70 in detail. With the data input in step 68, the initial conditions for the simulation are calculated at step 112. This includes the position of each of the pad points assigned to be traced, and the relative position of the region of interest, which initially is the CSS zone. The new location of each assigned pad point after a time increment Δt is then calculated at step 114. Specifically in this step the following equations are calculated:

$$X'=R^* \cos(\omega d^* t+\omega p^* t), \text{ and}$$

$$Y'=R^* \sin(\omega d^* t+\omega p^* t),$$

where X', Y' is the new location coordinate of a pad point due to pad rotation in texturing time t (minutes), R is the substrate radius of a pad point (mm) and must satisfy Rdi≤R≤Rdo and Rpi≤R≤Rpo, where Rdi, Rdo, Rpi and Rpo are the radii from substrate center to the disc ID and OD, and the pad ID and OD, respectively, ωd is the disc rotation speed (RPM), and ωp is the pad rotation speed (RPM).

Correspondingly, the new location of each corresponding substrate point due to rotation of the disc is then calculated at step 116. In this step the following calculations are made:

$$X''=Rr^* \cos(\omega d^* t), \text{ and}$$

$$Y''=Rr^* \sin(\omega d^* t),$$

where X", Y" is the new location coordinate of a pad point due to disc rotation in time t, and Rr is the substrate radius of the pad center.

The trace of each pad point during the time increment relative to the substrate is then determined in step 118. The new location X,Y of the pad point is determined by the equations $$X=X'+X'', \text{ and}$$

$$Y=Y'+Y''.$$

It is thus seen that each pad point location $X,Y=F_{X,Y}(Rpi, Rpo,R,Rr,\omega d,\omega p,t)$, where $F_{X,Y}$ represents the motion equations used in steps 114, 116 and 118.

At step 120 a determination is made as to whether the trace exists on the substrate surface. If not, the elapsed time is compared to the maximum time at step 122. If the maximum time has not been reached, the time is incremented at step 124 by Δt and the procedure beginning with step 114 is repeated.

If the trace is determined to be on the substrate surface in step 120, the new position and trace of the pad point is plotted on display screen 44, as shown by step 126. Again, FIG. 8 is an illustration of such a plot after one second of elapsed time. Also, if the trace is within the zone of interest, such as in the CSS zone or on an assigned substrate radial line of points, as determined in step 128, then the cross angle and cross frequency for the pad point (or for the substrate point) is computed and stored during step 130, as was discussed above with reference to FIG. 7. Then, and also if the trace is not in the region of interest, step 122 is performed, as has been described.

This process thus continues until the traces for the selected pad point have been tracked for the full duration of time. Once completed, a determination is made in step 132 as to whether all the pad points have been traced. If not then the next pad point is selected in step 112, from which initial conditions are determined as has been described, and the process repeated for the new pad point.

Figure 9:
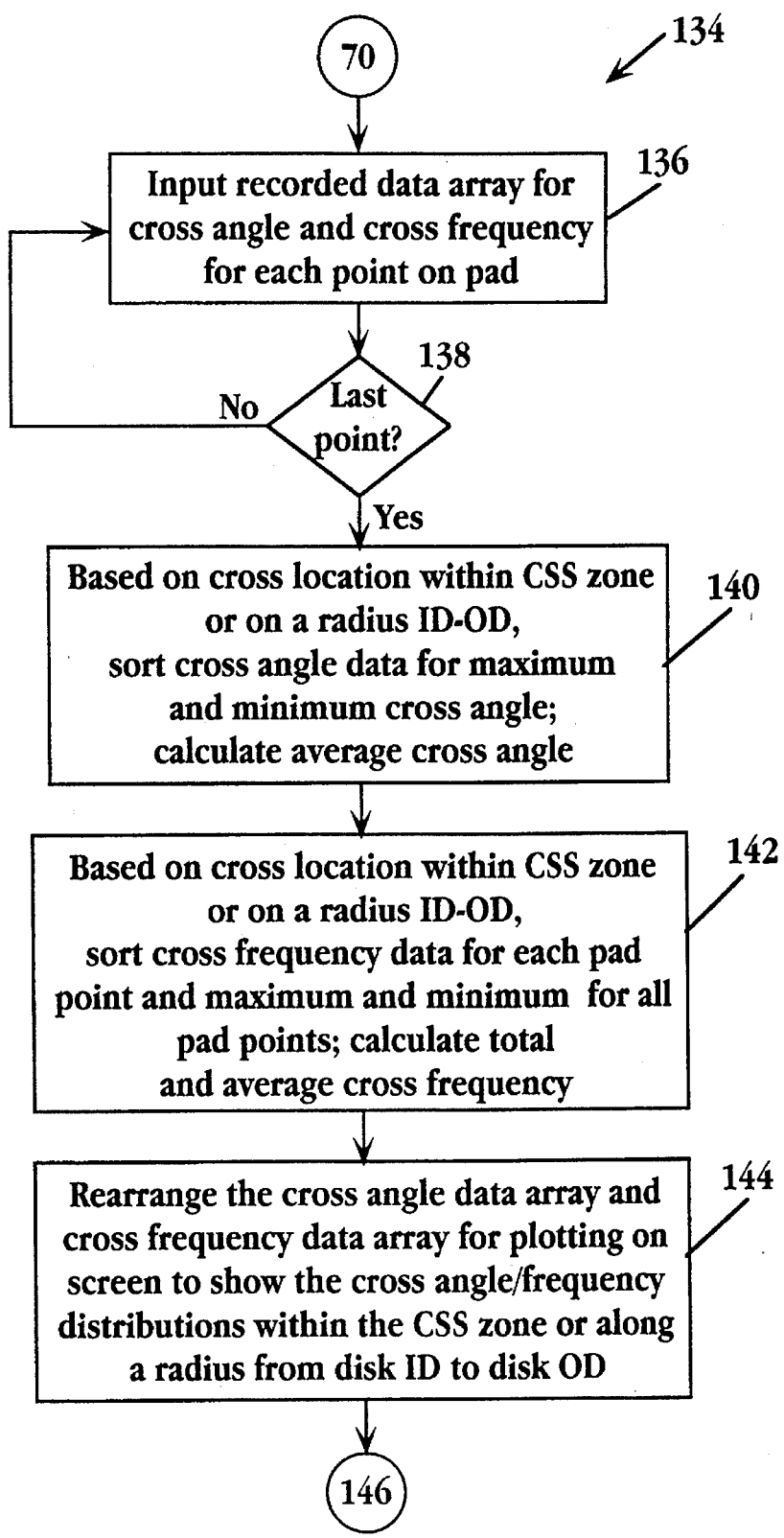
FIG. 9 is flow chart of the analysis portion of the simulation of FIG. 4.

Once the CSS zone computations are completed the texturing analysis at step 134 in FIG. 4 is performed. This analysis is shown in further detail in FIG. 9. At step 136, the generated data array for the cross angle θ and cross frequency for each point on the pad is retrieved from memory. Once the data for the last pad point is retrieved, as provided in step 138, the cross angle data is sorted in step 140 to identify maximum and minimum cross angle and calculate average cross angle for each cross location in the CSS zone. The same steps are also followed for a radial line extending between the substrate ID and OD. This is described below with reference to FIG. 10.

Also based on the cross locations within the CSS zone, the cross frequency and the maximum and minimum frequency of each of the pad points is determined. From this the total and average cross frequencies are calculated, all at step 142. Then in step 144, the cross angle and cross frequency data arrays are rearranged for plotting the distributions of cross angle and cross frequency within the CSS zone on the display screen.

After generating the data for the screen displays, a prompt asks the user in step 146 whether a print out is desired. If so, a hard copy is printed at step 148. One example of such a printout is shown in Table 2 below. This table lists the results for a series of simulations that were made for a 48 mm disc. For each combination of input data, including spindle and quill speeds, given in revolutions per minute, and the size and position of the pad, the output data, including cross frequencies and maximum and average cross-hatch angles 2θ for the CSS zone and along a substrate radius are provided.

TABLE 2

| Spindle/Quill Speed | Pad Size (mm) & Position, 0 = center | CSS Zone Analysis | | | Disc ID-OD Radius Analysis | | |
|---|---|---|---|---|---|---|---|
| | | Cross Frequency | Max Angle | Average Angle | Cross Frequency | Max Angle | Average Angle |
| 156/42 | 28, +3 | 533 | 56 | 22.5 | 4191 | 51 | 8 |
| " | 28, −1 | 713 | 62 | 28.5 | 5283 | 56.5 | 7.5 |
| " | 28, 0 | 538 | 62 | 18.5 | 5134 | 55 | 7.5 |
| " | 24, 0 | 793 | 62 | 26.5 | 5571 | 50 | 7 |
| " | 22, 0 | 1063 | 48.5 | 24.5 | 5829 | 45 | 6.5 |
| " | 22, +1 | 800 | 53 | 22 | 5539 | 46 | 6.5 |
| " | 22, −1 | 913 | 57.5 | 28 | 6115 | 56 | 7 |
| " | 20. 0 | 804 | 51.5 | 26 | 6145 | 48.5 | 6 |
| 125/54 | 22, 0 | 573 | 78 | 39 | 4738 | 86 | 10 |
| 146/57 | 22, 0 | 804 | 68 | 35 | 5513 | 79 | 9 |
| 156/40 | 22. 0 | 890 | 57 | 25 | 5908 | 56 | 7 |
| 156/42 | 22, 0 | 1063 | 48.5 | 24.5 | 5829 | 45 | 6.5 |
| 156/−42 | 22, 0 | 1000 | 53 | 23 | 5760 | 40.5 | 6.5 |
| −156/42 | 22, 0 | 1070 | 50 | 22 | 5900 | 38 | 6.5 |
| −156/−42 | 22, 0 | 1062 | 48.5 | 22.5 | 5951 | 44.5 | 6.5 |
| 156/44 | 22, 0 | 958 | 60 | 26 | 5981 | 60 | 7 |
| 156/47 | 22, 0 | 875 | 62 | 28.5 | 5806 | 60 | 7 |
| 151/50 | 22, 0 | 234 | 56 | 42 | 5504 | 34 | 7 |
| 150/60 | 22, 0 | 867 | 73 | 39 | 5675 | 58 | 8.5 |
| 162/42 | 22, 0 | 808 | 55 | 25 | 6176 | 55 | 6.5 |
| 162/44 | 22, 0 | 889 | 56 | 26.5 | 6121 | 56 | 6.5 |
| 162/45 | 22, 0 | 697 | 45 | 26 | 6112 | 48.5 | 6.5 |
| 162/47 | 22, 0 | 924 | 61 | 26.5 | 6112 | 63 | 7 |
| 171/45 | 22, 0 | 964 | 52 | 24.5 | 6501 | 40 | 6 |
| 171/48 | 22, 0 | 958 | 60.5 | 25 | 6486 | 56 | 7 |
| 171/52 | 22, 0 | 833 | 65 | 29 | 6469 | 56 | 7 |
| 171/78 | 22, 0 | 937 | 78 | 39 | 6465 | 92 | 10.5 |
| 161/43 | 22, 0 | 887 | 50 | 22 | 6181 | 56 | 6.6 |
| 171/46 | 22, 0 | 915 | 53 | 25 | 6496 | 56 | 6.2 |
| 145/39 | 22, 0 | 840 | 52 | 26 | 5481 | 56 | 6.5 |

Regarding the pad position indicator, a "0" indicates that the pad axis is centered between the substrate inner and outer diameters, or 15 mm from the disc axis. An integer value indicates the number of millimeters away from the center or "0" position, with a positive value indicating a position farther from the disc axis and a negative value indicating a position closer to the disc axis. In viewing these simulation results it is seen that the spindle rotational speed for a 48 mm disc was varied from 125 rpm to 171 rpm, while the quill speed was varied from 39 rpm to 78 rpm. The ratio of spindle speed to quill speed was varied from 2.2:1 to 3.9:1. Pad diameters of 20, 22, 24 and 28 mm were used. The time of texturing was 25 seconds in all cases.

It has been found that disc-to-pad speed ratios between 1:1 and 20:1, for disc and pad rotations in the same direction produce a gradient texturing with higher cross-hatch angles at the ID. Correspondingly, ratios between −2:1 and −10:1, that is, for rotations in opposite directions, also produce gradient texturing with higher cross-hatch angles at the ID. As used herein, gradient texturing refers to the continuous gradient in the disc texture existing between ID and OD. Further, the cross frequency must be sufficient to produce a minimum average summit density of $1000/mm^2$.

After the hard copy is printed, a determination is made at step 158 in FIG. 4 whether this is the end of the simulation. If so, the procedure of step 58 described with reference to FIG. 3 is followed. Otherwise, as in the present example, processing returns to step 66 for selection of the disk radius data generation. In step 160, similar to step 68 described with reference to CSS zone data, data is input associated with a radial line of substrate points. Again the pad positions, disc and pad sizes and speeds, and texturing time duration and increment are input.

Processing then moves to data generation step 70, detailed in and described with reference to FIG. 5 previously. In this case, the same steps are followed except that the region of interest is the radial line which preferably is divided into 500 segments defined by 501 spaced points. Thus, data is accumulated each time an assigned pad point crosses an assigned substrate radius segment.

Figure 10:
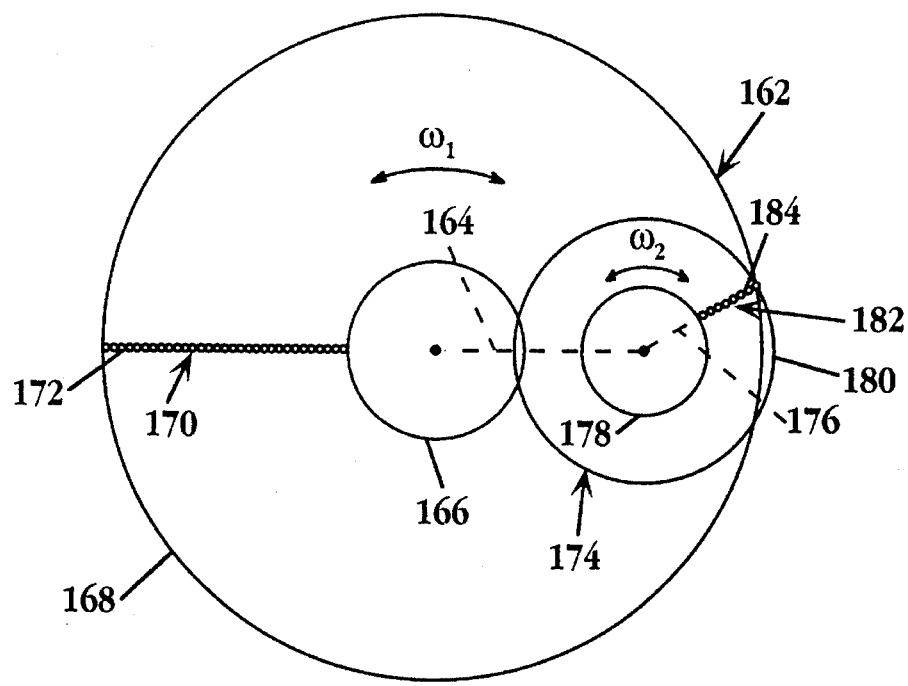
FIG. 10 is a view similar to FIG. 6 for simulation of texturing along a radial line on the substrate.

FIG. 10 illustrates this conceptually. A disc substrate 162 has an axis 164 with inner diameter (ID) line 166 and outer diameter (OD) line 168. A line 170 of substrate points, such as point 172 extends radially from substrate ID to OD. A pad 174 has an axis 176 offset from axis 164 and ID line 178 and OD line 180. A line 182 of pad points, such as point 184, extends from pad ID to OD. As with the CSS zone case, after pad particle trace data is generated for the 500 substrate segments in step 70, the data is analyzed in step 134, and the resulting summarized data printed out in step 148.

Referring again to Table 2, the data corresponding to the disc radius is shown on the right side of the table, with the same information associated with cross frequency and maximum and average angles provided. With the data listed for the same cases for both the CSS and radius zones, a preliminary determination is made as to whether a case satisfies the texturing objectives has been met.

In this case, the objective is to produce a substrate that has a relatively high amount of roughness and larger cross-hatch angles in the CSS zone, which is close to the inner diameter of the substrate, and a smooth transition to less roughness and smaller cross-hatch angles in the middle and outer regions of the substrate, where magnetic recording takes place. As shown in Table 2, the maximum angles are approximately the same between the two regions of interest. This is as expected, since the radius region passes through the CSS zone. However, in almost all cases the average angle is substantially less for the substrate radius. This indicates at the general level of analysis provided by Table 2 that all of these cases are worthy of further review.

The following table, Table 3, summarizes simulation data showing the averaged cross line density and cross-hatch angle 2θ of a 95 mm disc, for different time periods, t=5, 10, 15, 20 and 25 seconds, for both a gradient zone texturing (GZT) process and a circumferential texturing (CIR) process. Calculations are made for three substrate radial segments corresponding to inner (ID), middle (MD) and outer (OD) diameters.

TABLE 3

| | ID(19.5–23) | MD(30–33.0) | OD(40.5–44 mm) |
|---|---|---|---|
| Gradient Zone Texture | | | |
| Cross Line Density | | | |
| 25 (seconds) | 215 | 194 | 307 |
| 20 | 152 | 158 | 252 |
| 15 | 102 | 123 | 183 |
| 10 | 86 | 70 | 121 |
| 5 | 64 | 36 | 55 |
| Cross-Hatch Angle (2θ) | | | |
| 25 (seconds) | 26 | 12 | 5 |
| 20 | 23 | 12 | 5 |
| 15 | 34 | 13 | 6 |
| 10 | 38 | 15.8 | 4.2 |
| 5 | 40 | 28 | 4.2 |

TABLE 3-continued

| | ID(19.5–23) | MD(30–33.0) | OD(40.5–44 mm) |
|---|---|---|---|
| Circumferential Texture | | | |
| Cross Line Density | | | |
| 25 (seconds) | 158 | 138 | 220 |
| 20 | 148 | 104 | 140 |
| 15 | 98 | 93 | 130 |
| 10 | 80 | 69 | 45 |
| 5 | 35 | 32 | 32 |
| Cross-Hatch Angle (2θ) | | | |
| 25 (seconds) | 3.9 | 4 | 2 |
| 20 | 3.8 | 4 | 2.2 |
| 15 | 34 | 13 | 2.2 |
| 10 | 38 | 15.8 | 4.6 |
| 5 | 40 | 28 | 4.2 |

Figure 11A:
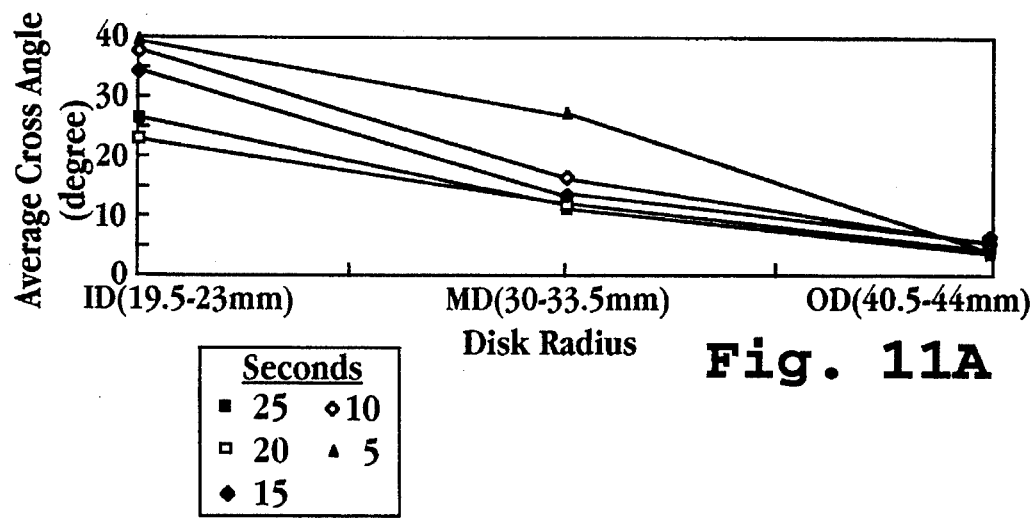
FIGS. 11A and 11B compare the averaged cross angle at ID, MD, and OD regions of a substrate, after simulated texturing for 5 secs (closed triangles), 10 secs (open diamonds), 15 secs (closed diamonds), 20 seconds (open squares), and 25 secs (closed squares) in accordance with the present invention (FIG. 11A) and by circumferential texturing (FIG. 11B).
Figure 11B:
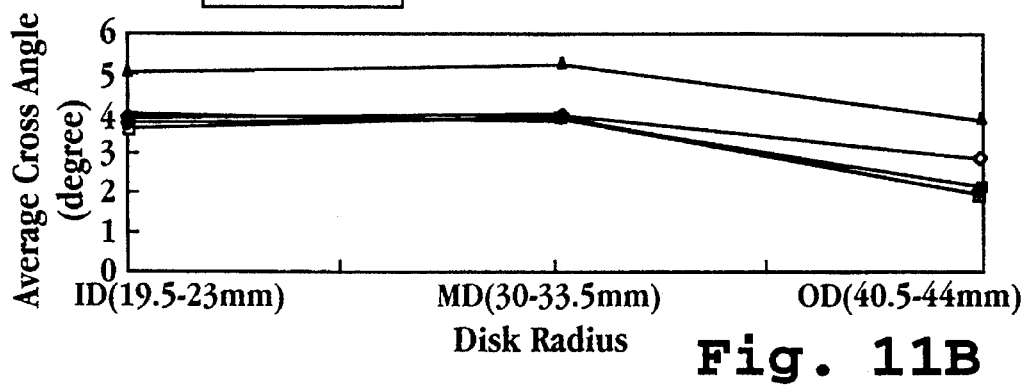
Figure 12A:
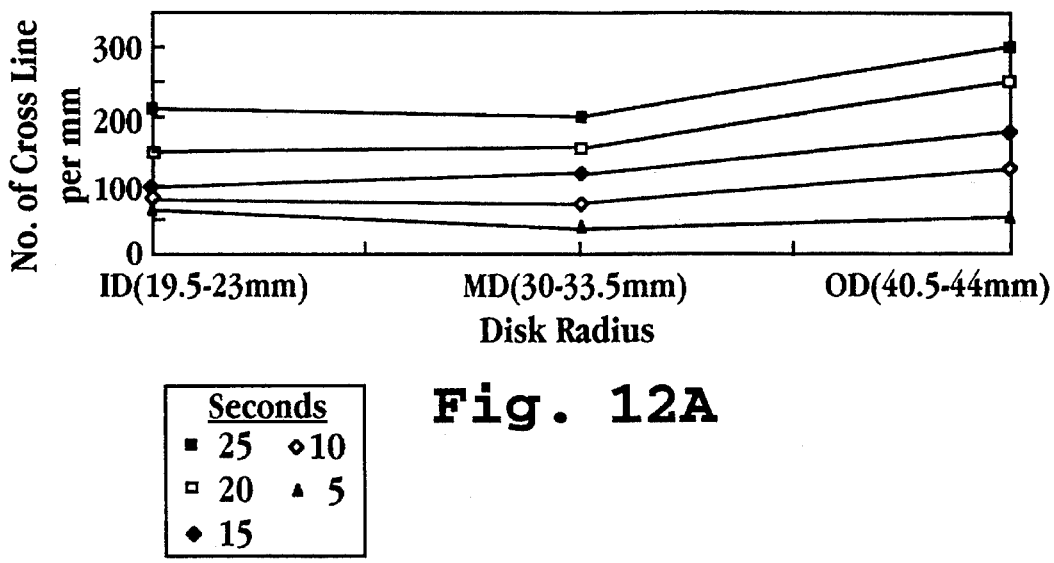
FIGS. 12A and 12B compare the averaged cross line density vs time at ID, MD, and OD regions of a substrate, after simulated texturing for 5 secs (closed triangles), 10 secs (open diamonds), 15 secs (closed diamonds), 20 seconds (open squares), and 25 secs (closed squares) in accordance with the present invention (FIG. 12A) and by circumferential texturing (FIG. 12B)
Figure 12B:
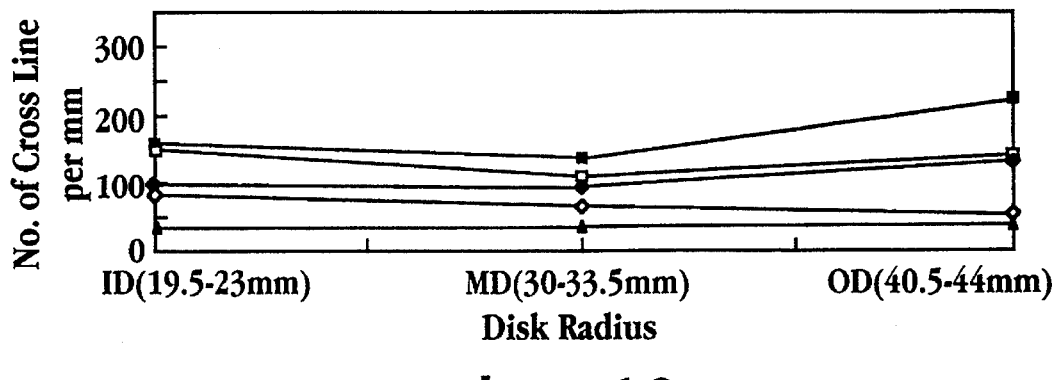

The cross-hatch angle data from Table 3 is plotted in FIGS. 11A and 11B for the gradient zone texturing (GZT) and circumferential texturing (CIR) simulations, respectively. The crossing line density data from Table 3 is plotted in FIGS. 12A and 12B for the GZT and CIR texturing simulations, respectively. In these figures, the results for a time t=5 sec. is represented by a solid or closed triangle, for t=10 sec. by an outlined or open diamond, for t=15 sec. by a closed diamond, for t=20 sec. by an open square, and for t=25 sec. by a closed square.

For CIR, the angle is seen to increase between ID and MD and then decrease at OD to a level slightly below that at ID. For GZT, the angle decreases between ID and OD, with the angle at ID generally being at least four times the angle at OD.

To insure that the density of crosses is sufficient to produce desired uniformity and roughness properties in the disc, in general, a summit density of at least about 1,000/mm$^2$ is advantageous. A summit is defined as the highest point among 4 adjacent points in a textured region. Summit density is then determined from the density of summits within a given mm$^2$ area. Since summit density is determined by the product of the linear density of summits measured along orthogonal axes in the surface plane, the greater the number of summits along each axis, the greater the summit density.

Figure 13A:
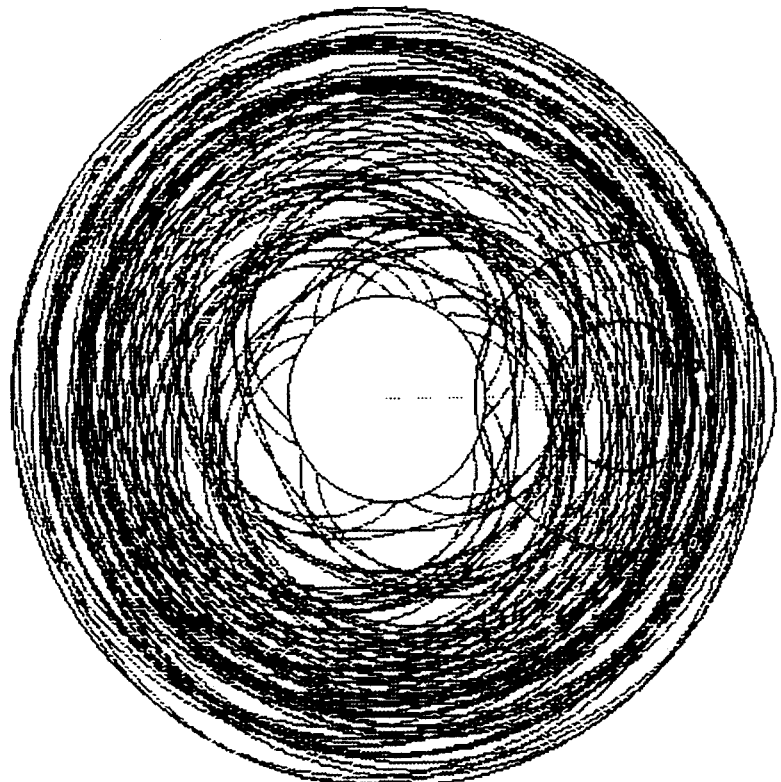
FIGS. 13A and 13B simulated texturing patterns produced after 10 secs (13A) and 20 secs (13B) in accordance with the invention.
Figure 13B:
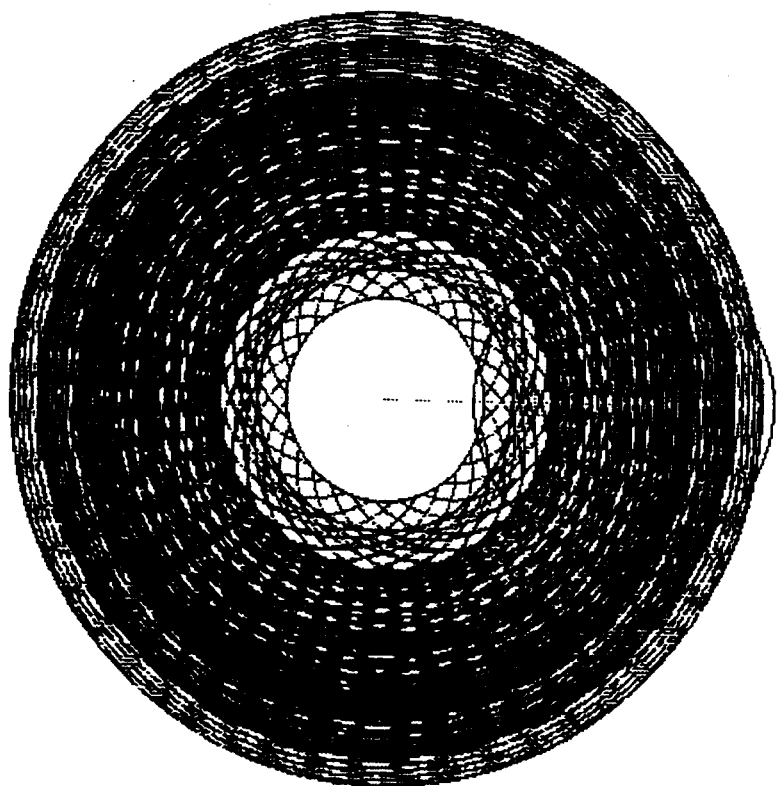
Figure 14A:
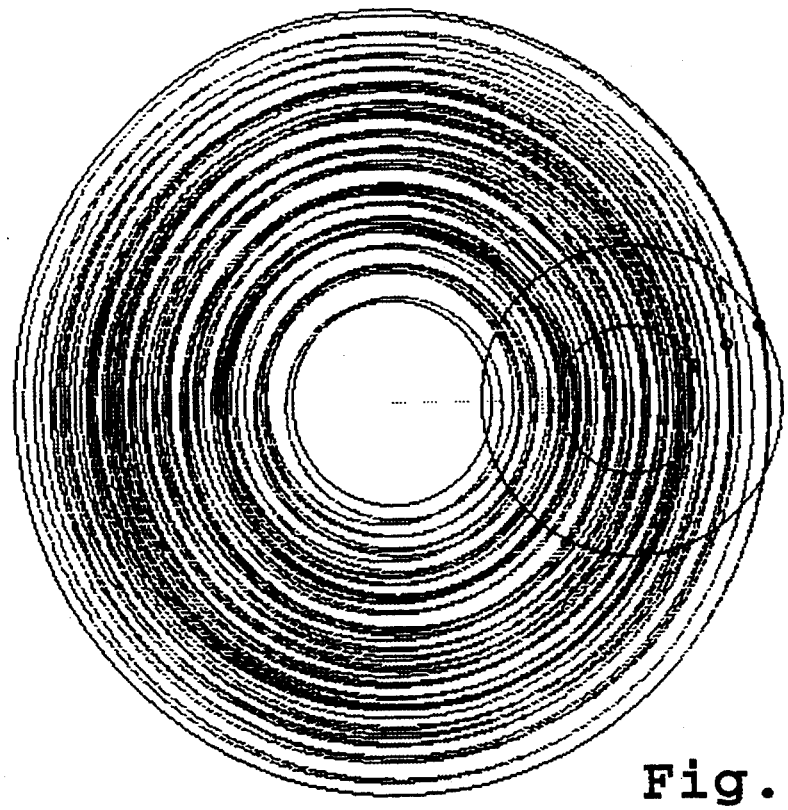
FIGS. 14A and 14B show simulated texturing patterns produced after 10 secs (14A) and 20 secs (14B) by circumferential texturing.
Figure 14B:
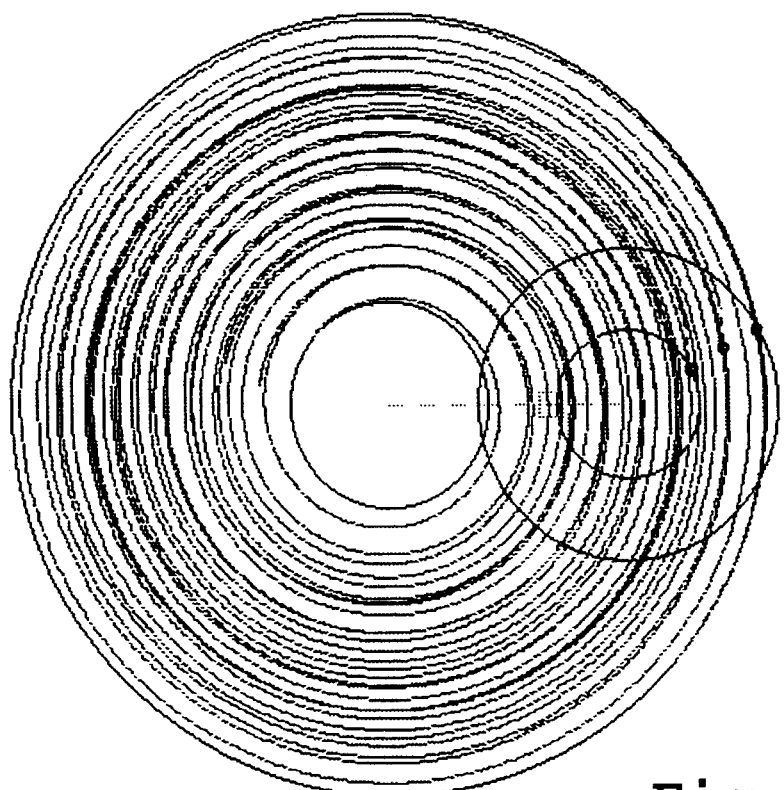

FIGS. 13 and 14 show plots of the simulated physical texturing patterns for GZT and CIR. More specifically, FIGS. 13A and 13B show the patterns for GZT for t=10 and 20 seconds, respectively. FIGS. 14A and 14B show the patterns for CIR for t=10 and 20 seconds, respectively. These figures provide a visual image corresponding to the associated cases summarized in Table 3.

In particular, it is apparent that for GZT there is a higher density of crossings near the ID than that of circumferential texture. It is also especially apparent that the cross-hatch angle is greatest at the ID.

For CIR, the cross frequency appears less consistent along the disc radius. Further, the cross-hatch angles appear very small in that the traces are generally circular regardless of radial position.

In both the CIR and GZT cases a 38 mm pad was used. For GZT, spindle and quill speeds were 171 and 78 RPM. respectively. For CIR, these speeds were 125 and 5 RPM, respectively. As has been mentioned, it appears that a maximum disc-to-pad speed ratio of 20:1 is necessary to produce the desired gradient texturing between ID and OD. A time of texturing of greater than 15 seconds is required to achieve this. The resultant cross-hatch angle ratio between ID and OD is then found to be at least 2:1.

Referring again to FIG. 4 and completing a description of simulation step 57, if it is desired to analyze data previously generated, then in step 66 the existing data base option is selected and the data is input at step 194. The analysis type desired is selected in step 196. That is analysis of either the CSS zone or disc radius is selected. Processing then goes to texturing analysis step 134 as has been described.

Figure 15:
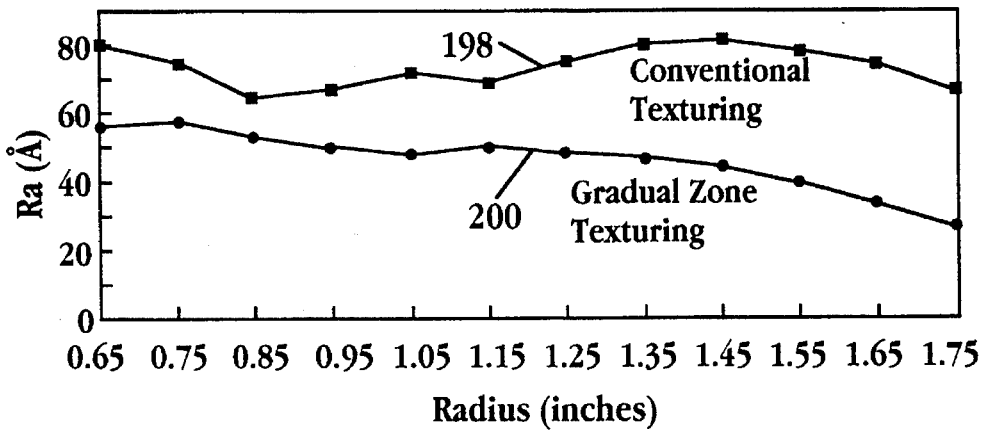
FIG. 15 is a graph showing roughness as a function of substrate radius for conventional cross hatch texturing and texturing according to the invention.

A physical texturing was performed corresponding to the case in Table 2 with spindle and quill speeds of 156 RPM and 42 RPM, respectively, and a 28 mm pad having an inner diameter of 11 mm. FIG. 15 provides a graph of the roughness average Ra in angstroms from the inner diameter at 0.65 inches to the outer diameter at 1.75 inches of a 95 mm disc for both conventional cross hatch texturing, shown as line 198, and for gradient zone texturing according to the invention, shown as line 200. The roughness average of the conventionally textured substrate varies generally between 66 Å and 82 Å along the length of the substrate radius. However, the roughness average for the gradient zone texturing (GZT) according to the invention varies continuously from a maximum roughness average near the inner diameter to a minimum value of about 28 Å at the outer diameter. Although the roughness average at the CSS zone is not as high as with the conventional disc in this case, the substrate is substantially smoother outwardly from the CSS zone. Further testing has shown the disc made according to the invention to have initial and final static and dynamic friction very similar to a conventionally textured disc.

Figure 16:
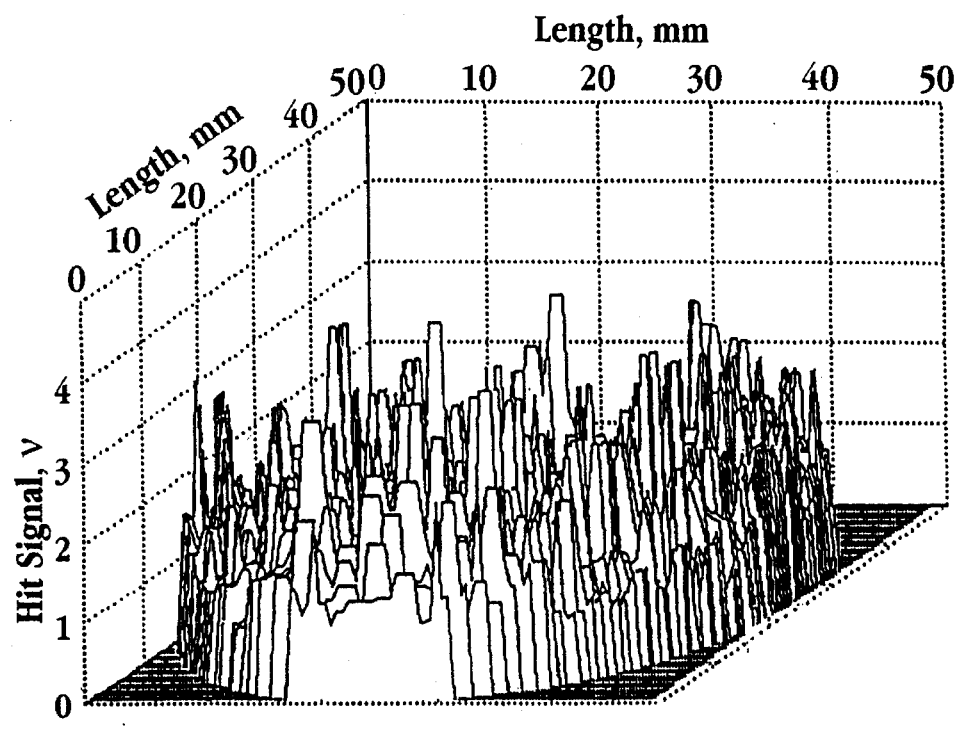
FIG. 16 is a three-dimensional representation of the results of a flying height test of a disc after conventional cross hatch texturing as illustrated in FIG. 15.
Figure 17:
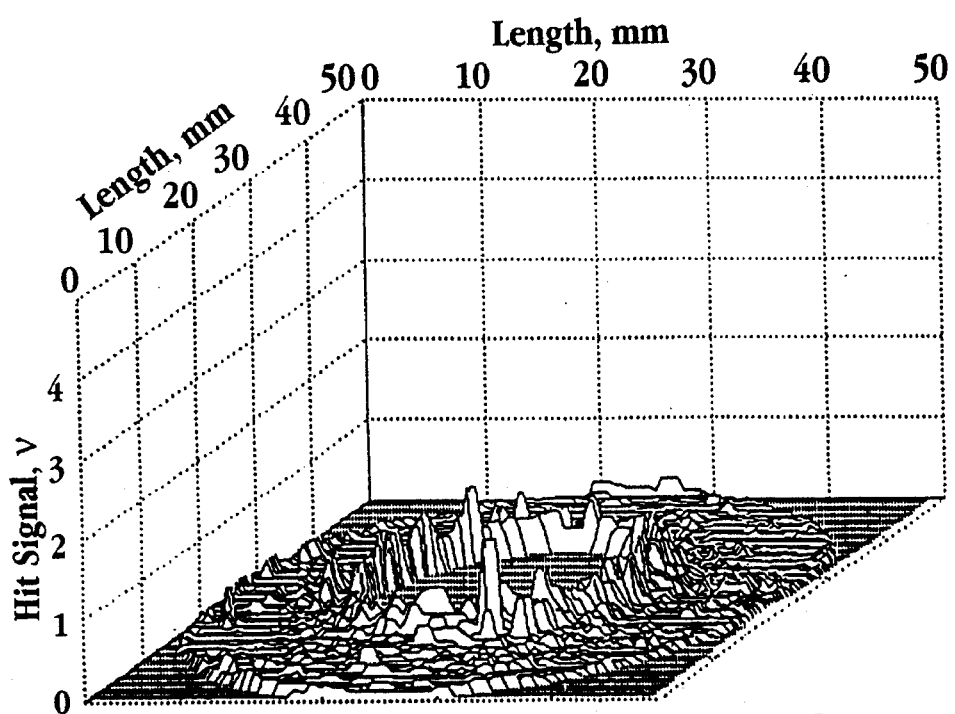
FIG. 17 is a three-dimensional representation of the results of a flying height test of a disc textured according to the invention as illustrated in FIG. 15.

A graphic representation of the results of glide height testing performed on the conventionally textured disc and the gradient zone textured (GZT) disc made according to the invention is shown in FIGS. 16 and 17. FIG. 16 shows in a three-dimensional representation of the glide mapping results of a conventionally cross hatch textured (CT) disc at a level of 2 microinches. Similarly, FIG. 17 shows the glide mapping for a GZT disc. It is seen that hits occur primarily around the inner diameter in FIG. 17 whereas they occur generally uniformly across the width of the disc in FIG. 16.

A comparison of other electrical parameters was also performed for CT and GZT 95 mm discs. Table 4 below shows the results of a magnetic recording test conducted on a Guzik 501 read/write analyzer. The discs were divided into five zones of zone-bit recording. The radii of zones 1–5 are 0.946 inches, 1.060 inches, 1.101 inches, 1.160 inches, and 1.329 inches. The HF writing frequencies for zone 1–5 were 5.44, 6.60, 7.20, 7.76 and 8.50 MHz, respectively. Bit shift filters for zone 1 to zone 2 and for zone 3 to zone 5 were at 7.5 MHz and 9.7 MHz, respectively. The bit shift filters were 5-pole Bessel type and the read filter was a 5-pole Butterworth type. The parametric filter was 20 MHz and the overwrite filter was 2 MHz for all zones. A Read-Rite™ thin-film head with 34 turns and a gap length of 0.37 microns was used. The pole tip dimensions were P1 width=11μ, P2 width=9μ, P1 thickness=3.5μ, and P2 thickness=3.5μ. The Z-height was 43 mils and there was a 6.5 gram load.

TABLE 4

|  | LF Amp (mV) | HF Amp (mV) | Res. (%) | PW50 (ns) | S/N (dB) | Bit Shift (ns) | O/W (−dB) |
|---|---|---|---|---|---|---|---|
| Zone 1 |  |  |  |  |  |  |  |
| CT | 0.368 | 0.370 | 100.57 | 92.83 | 33.25 | 9.89 | 35.97 |
| GZT | 0.380 | 0.385 | 101.5 | 89.70 | 34.00 | 8.60 | 37.02 |
| Zone 2 |  |  |  |  |  |  |  |
| CT | 0.178 | 0.144 | 81.17 | 83.65 | 32.21 | 9.87 | 32.42 |

TABLE 4-continued

|  | LF Amp (mV) | HF Amp (mV) | Res. (%) | PW50 (ns) | S/N (dB) | Bit Shift (ns) | O/W (−dB) |
|---|---|---|---|---|---|---|---|
| GZT | 0.181 | 0.151 | 83.15 | 81.28 | 32.72 | 9.35 | 33.77 |
| Zone 3 |  |  |  |  |  |  |  |
| CT | 0.191 | 0.172 | 89.81 | 77.25 | 34.60 | 6.07 | 30.30 |
| GZT | 0.195 | 0.177 | 90.80 | 75.12 | 35.04 | 5.82 | 31.37 |
| Zone 4 |  |  |  |  |  |  |  |
| CT | 0.218 | 0.202 | 92.78 | 72.22 | 34.96 | 5.19 | 26.41 |
| GZT | 0.222 | 0.207 | 93.26 | 70.18 | 36.16 | 4.76 | 28.45 |
| Zone 5 |  |  |  |  |  |  |  |
| CT | 0.575 | 0.474 | 82.46 | 60.78 | 33.31 | 7.78 | 20.38 |
| GZT | 0.588 | 0.487 | 82.90 | 58.88 | 35.23 | 5.48 | 22.69 |

The testing parameters identified in the table are as follows: amplitude at low frequency (LF Amp.), amplitude at high frequency (HF Amp.), resolution (Res), isolated pulse width (PW50), signal to noise ratio (S/N), bit shift, and overwrite (O/W). In general, the higher the value of Res, S/N, and O/W, the better the drive performance. Also, the lower the value of PW50 and bit shift, the better for magnetic recording. The table shows that gradient zone texturing produces equivalent or better drive performance, and generally better magnetic performance compared to conventional texturing.

Although the present invention has been described with reference to 48 mm and 95 mm discs, it can readily be applied to other disc sizes, such as 65 mm discs. Further, other sizes of pads and speeds of pads and discs may be used in practicing the present invention. Further, depending upon these choices, other time periods may be preferable. In the cases shown 25 seconds was found to be sufficient to provide uniform cross distributions.

Thus, although the invention has been described with respect to particular embodiments, it will be apparent to those skilled in the art that various changes and modifications can be made without departing from the invention.

It is claimed:

1. A disc substrate for use in forming a magnetic recording medium comprising an annular surface having inner, middle, and outer diameter regions, and formed on said surface, a gradient textured pattern of grooves in and between the inner and outer diameter regions that is characterized by an averaged cross-hatch angle which is at least about 2 times greater at the inner-diameter region than at the outer-diameter region, where the averaged cross-hatch angle is defined as the average of twice the angle a groove makes with a line extending in a circumferential direction.

2. The substrate of claim 1, wherein the averaged cross-hatch angle at the inner-diameter region is between about 20–30 degrees, and the averaged cross-hatch angle at the outer-diameter region is between about 3–8 degrees.

3. The substrate of claim 1, wherein the averaged cross-hatch angle is at least 4 times greater at the inner-diameter region than at the outer-diameter region.

4. The substrate of claim 1, wherein said pattern of grooves is further characterized as having a minimum average summit density of 1000/mm².

* * * * *